(12) United States Patent
Takada et al.

(10) Patent No.: US 10,960,897 B2
(45) Date of Patent: Mar. 30, 2021

(54) CONTROL SYSTEM FOR FOUR-WHEEL DRIVE VEHICLE

(71) Applicant: TOYOTA JIDOSHA KABUSHIKI KAISHA, Aichi-ken (JP)

(72) Inventors: Norifumi Takada, Mishima (JP); Akio Sugawara, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 16/687,570

(22) Filed: Nov. 18, 2019

(65) Prior Publication Data

US 2020/0166129 A1    May 28, 2020

(30) Foreign Application Priority Data

Nov. 27, 2018  (JP) .............................. JP2018-221102

(51) Int. Cl.
```
B60W 50/08      (2020.01)
B60W 10/06      (2006.01)
B60W 10/119     (2012.01)
B60W 30/182     (2020.01)
```
(52) U.S. Cl.
CPC .......... B60W 50/082 (2013.01); B60W 10/06 (2013.01); B60W 10/119 (2013.01); B60W 30/182 (2013.01); B60W 2720/403 (2013.01); B60Y 2400/82 (2013.01)

(58) Field of Classification Search
None
See application file for complete search history.

(56) References Cited

U.S. PATENT DOCUMENTS

| | | | |
|---|---|---|---|
| 8,612,080 B2 * | 12/2013 | Steuernagel | B60L 3/0061 701/22 |
| 8,670,887 B2 * | 3/2014 | Nishimori | B60K 6/52 701/22 |
| 9,346,460 B2 * | 5/2016 | Mansur | B60W 20/40 |
| 9,598,067 B2 * | 3/2017 | Chimner | B60W 10/02 |

FOREIGN PATENT DOCUMENTS

JP    H10-272955 A    10/1998

* cited by examiner

*Primary Examiner* — Dirk Wright
(74) *Attorney, Agent, or Firm* — Hauptman Ham, LLP

(57) ABSTRACT

A control system for a four-wheel drive vehicle configured to improve energy efficiency by avoiding selection of a four-wheel drive mode more than necessary. The control system comprises a controller that shifts an operating mode between a two-wheel drive mode and a four-wheel drive mode. When a control of the prime mover is terminated, the controller detects the operating mode selected by a switch before restarting the control of the prime mover. If the two-wheel drive mode or the four-wheel drive mode was selected by the switch before restarting the control of the prime mover, the controller selects the two-wheel drive mode when restarting the control of the prime mover.

6 Claims, 4 Drawing Sheets

CONTROL SYSTEM FOR FOUR-WHEEL DRIVE VEHICLE

CROSS REFERENCE TO RELATED APPLICATIONS

The present disclosure claims the benefit of Japanese Patent Application No. 2018-221102 filed on Nov. 27, 2018 with the Japanese Patent Office, the disclosure of which is incorporated herein by reference in its entirety.

BACKGROUND

Field of the Disclosure

Embodiments of the present disclosure relate to the art of a control system for controlling a driving mode of a four-wheel drive vehicle in which an operating mode can be selected from a four-wheel drive mode (4WD) and a two-wheel drive mode (2WD).

Discussion of the Related Art

JP-A-H10-272955 describes one example of a four-wheel drive vehicle in which an operating mode can be selected from a four-wheel drive mode and a two-wheel drive mode. Specifically, the vehicle taught by JP-A-H10-272955 is based on a two-wheel drive vehicle in which a drive force generated by an engine is transmitted to rear wheels through a transmission, and in the vehicle taught by JP-A-H10-272955, the drive force generated by the engine is also transmitted partially to front wheels. For this purpose, the vehicle taught by JP-A-H10-272955 is provided with a transfer that transmits the drive force selectively to the front wheels, a transmission that varies the drive force, and a selector device that selectively allows a differential rotation between the front wheels and the rear wheels. In the vehicle taught by JP-A-H10-272955, therefore, an operating mode may be selected from a two-wheel drive mode, a fulltime four-wheel drive mode in which a differential rotation between the front wheels and the rear wheels is allowed, and a fixed-high four-wheel drive mode and a fixed-low four-wheel drive mode in which a differential rotation between the front wheels and the rear wheels is not allowed.

In the vehicle taught by JP-A-H10-272955, the operating mode is selected by turning a switch among positions corresponding to the above-mentioned modes and an auto position. When the switch is turned to the auto position, the operating mode is switched automatically among the fulltime four-wheel drive mode, the two-wheel drive mode, the fixed-high four-wheel drive mode, and the fixed-low four-wheel drive mode. According to the teachings of JP-A-H10-272955, if the vehicle is launched while turning the switch to the auto position, the vehicle is launched in the fulltime four-wheel drive mode.

When the operating mode is shifted between the two-wheel drive mode and the four-wheel drive mode, a rotational speed of a rotary member in a drive system transmitting the drive force to the front wheels or the rear wheels may be changed thereby causing an undesirable shock. Such shock may be prevented by switching the operating mode between the two-wheel drive mode and the four-wheel drive mode manually by the switch as taught by JP-A-H10-272955.

However, in the conventional four-wheel drive vehicles including the four-wheel drive vehicle described in JP-A-H10-272955, the selection switch of the operating mode transmits a mode-selection signal according to the selected position as long as the vehicle is activated. Therefore, if the vehicle is stopped in the four-wheel drive mode and a main switch such as an ignition switch is turned off, the four-wheel drive mode selected when turning off the main switch will be selected continuously when turning on the main switch again to start the vehicle.

In most cases, the vehicle is parked in a flat and safe place even if the vehicle is a four-wheel drive vehicle. That is, it is not necessary to launch the vehicle in the four-wheel drive mode in most cases. However, if the vehicle equipped with the above-mentioned selection switch was parked in the four-wheel drive mode, the four-wheel drive mode will also be selected when launching the vehicle. In this case, therefore, the power transmission device such as the transfer will be rotated by a torque of e.g., an engine, and fuel will be consumed undesirably due to a power loss derived from friction. Likewise, in a conventional electric four-wheel drive vehicle (e4WD vehicle) in which any one of pairs of front wheels and rear wheels is rotated by an engine and the other one of the front wheels and rear the wheels is rotated by a motor, the vehicle will be launched by the motor in the four-wheel drive mode when started again. Therefore, electric consumption will be increased to operate the motor, and a power loss will be increased due to energy conversion resulting from operating the motor by an electric power generated by driving a generator by the engine.

SUMMARY

Aspects of embodiments of the present disclosure have been conceived noting the foregoing technical problems, and it is therefore an object of the present disclosure to provide a control system for a four-wheel drive vehicle configured to improve energy efficiency by avoiding selection of a four-wheel drive mode more than necessary.

The control system according to the embodiment of the present disclosure is applied to a four-wheel drive vehicle in which an operating mode is selected from a two-wheel drive mode in which a torque generated by a prime mover is delivered to any one of pairs of front wheels and rear wheels to propel the vehicle, and a four-wheel drive mode in which the torque generated by the prime mover is delivered to both pairs of the front wheels and the rear wheels. In the four-wheel drive vehicle, the operating mode may be selected by manually operating a mode selection switch. In order to achieve the above-explained objective, the control system is provided with a controller that shifts the operating mode between the two-wheel drive mode and the four-wheel drive mode. Specifically, the controller is configured to: detect the operating mode selected by the mode selection switch before restarting a control of a prime mover, if the control of the prime mover is terminated; and select the two-wheel drive mode when restarting the control of the prime mover, if the two-wheel drive mode or the four-wheel drive mode was selected by the mode selection switch before restarting the control of the prime mover.

In a non-limiting embodiment, the four-wheel drive mode may include: a high mode in which the torque generated by the prime mover is delivered to both pairs of the front wheels and the rear wheels while being multiplied, or without being multiplied and reduced or while being reduced; and a low mode in which the torque generated by the prime mover is delivered to both pairs of the front wheels and the rear wheels while being multiplied. The mode selection switch may be is adapted to further select the high mode and the low mode. The controller may be further configured to: select the two-wheel drive mode when restarting the control of the prime mover, if the two-wheel drive mode or the high mode of the four-wheel drive mode was selected by the mode selection switch before restarting the control of the prime mover; and select the low mode of the four-wheel drive mode when restarting the control of the prime mover, if the low mode was selected by the mode selection switch before restarting the control of the prime mover.

In a non-limiting embodiment, the prime mover may include an engine that generates a drive force delivered to the pair of rear wheels, and a motor that generates a drive force delivered to the pair of front wheels. The four-wheel drive vehicle comprises: a first transmission route to transmit an output torque of the engine to the pair of rear wheels; and a second transmission route to transmit an output torque of the motor to the pair of front wheels. The first transmission route may include a first switching mechanism that switches a mode thereof between: a speed reducing mode in which an input torque thereto is multiplied at a predetermined factor to be delivered to the pair of rear wheels; and a non-deceleration mode in which the input torque thereto is varied at a factor smaller than the factor in the speed reducing mode to be delivered to the pair of rear wheels. The second transmission route may include a second switching mechanism that switches a mode thereof between: a speed reducing mode in which an input torque thereto is multiplied at a predetermined factor to be delivered to the pair of front wheels; and a non-deceleration mode in which the input torque thereto is varied at a factor smaller than the factor in the speed reducing mode to be delivered to the pair of front wheels.

In a non-limiting embodiment, the second switching mechanism may comprise an engagement device having a drive member and a driven member selectively engaged with each other. The speed reducing mode may be established by engaging the drive member with the driven member, and the non-deceleration mode may be established by disengaging the drive member from the driven member.

According to the embodiment of the present disclosure, if the control of the prime mover is once terminated and the control of the prime mover will be started again, the operating mode selected by the mode selection switch before terminating the control of the prime mover is detected. If the control of the prime mover is terminated, a rotation of the prime mover is stopped, and a control to start and stop the prime mover upon satisfaction of predetermined conditions is terminated. When the control of the prime mover is restarted, the prime mover is rotated again, and the control to start and stop the prime mover is commenced again. According to the embodiment of the present disclosure, the operating mode of the four-wheel drive vehicle is selected by operating the mode selection switch manually, and the four-wheel drive vehicle is propelled in the operating mode selected by the mode selection switch as long as the prime mover is activated. If the two-wheel drive mode was selected by the mode selection switch before terminating the control of the prime mover, the two-wheel drive mode is continuously selected when restarting the control of the prime mover. Likewise, if the four-wheel drive mode was selected by the mode selection switch before terminating the control of the prime mover, and the control of the prime mover is terminated while selecting the four-wheel drive mode, the operating mode is shifted from the four-wheel drive mode to the two-wheel drive mode when restarting the control of the prime mover. According to the embodiment of the present disclosure, therefore, power loss can be reduced and the energy efficiency can be improved when restarting the control of the prime mover. In addition, the four-wheel drive vehicle may be launched stably even in the two-wheel drive mode without increasing the drive force significantly unless the road is especially rough. For these reasons, the four-wheel drive vehicle is allowed to be launched in a stable manner while saving fuel.

Specifically, if the high mode of the four-wheel drive mode was selected by the mode selection switch before restarting the control of the prime mover, the operating mode is shifted from the high mode to the two-wheel drive mode when restarting the control of the prime mover. By contrast, if the low mode of the four-wheel drive mode was selected by the mode selection switch before restarting the control of the prime mover, the low mode is continuously selected when restarting the control of the prime mover. In a case that the low mode was selected immediately before terminating the control of the prime mover, this means that the four-wheel drive vehicle was running on a rough road or climbing an upslope and hence the four-wheel drive vehicle is expected to continuously travel on the rough road or climb the upslope. In this case, therefore, the low mode of the four-wheel drive mode is continuously selected when restarting the control of the prime mover so as to allow the four-wheel drive vehicle to be launched easily on the rough road or upslope.

In the four-wheel drive mode, an output torque of the engine is delivered to the rear wheels through the first transmission route, and an output torque of the motor is delivered to the front wheels through the second transmission route. In the four-wheel drive mode, therefore, a power loss may be caused due to power conversion. According the embodiment of the present disclosure, however, the two-wheel drive is selected and the motor will not be operated as a motor when starting the control of the prime mover again. For this reason, the motor will not be driven unnecessarily so that the energy efficiency is improved.

As described, if the low mode of the four-wheel drive mode was selected by the mode selection switch before restarting the control of the prime mover, the low mode is continuously selected when restarting the control of the prime mover. The engagement device as a dog clutch may not be disengaged even if a disengagement command is transmitted when a torque is applied thereto, and may be disengaged unintentionally when the torque is varied as a result of restarting the control of the prime mover. In this situation, however, the engagement device will not be disengaged unless the mode selection switch is operated. According the embodiment of the present disclosure, therefore, the operating mode will not be shifted unintentionally to the two-wheel drive mode or the high mode due to unintentional disengagement of the engagement device.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
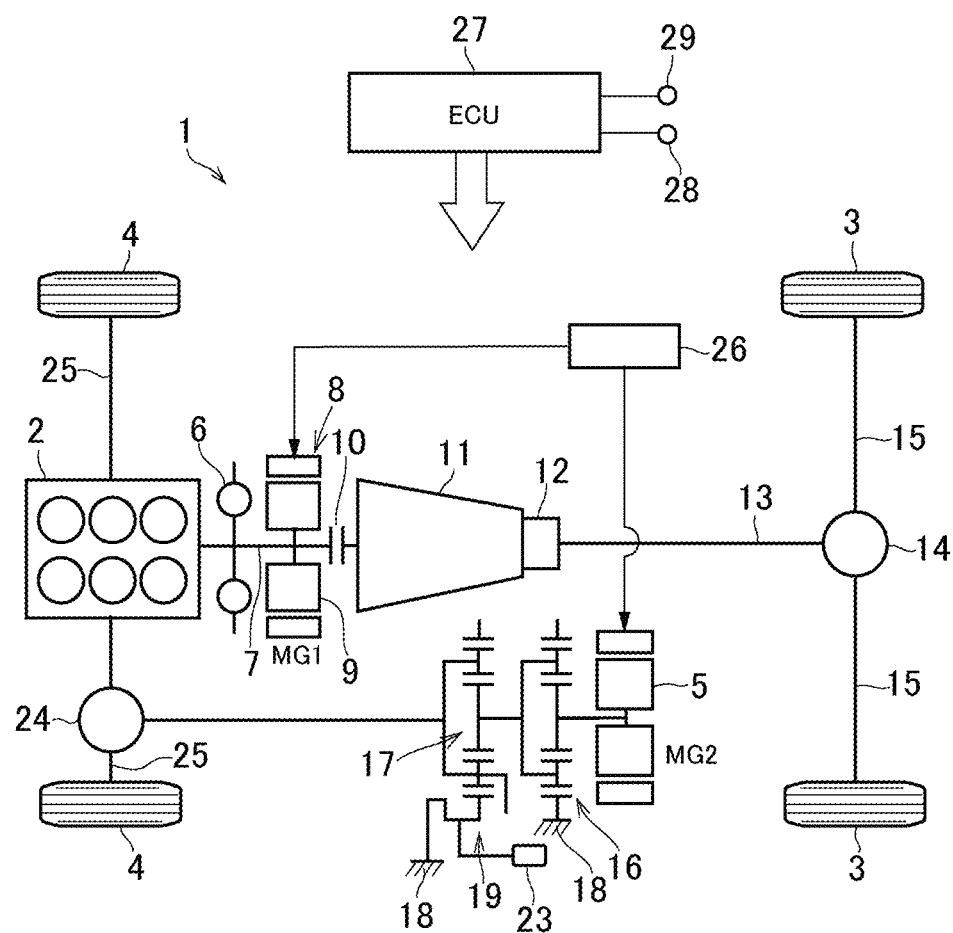
FIG. 1 is a schematic illustration showing one example of a powertrain of a four-wheel drive vehicle to which the control system according to the embodiment of the present disclosure is applied.

Embodiments of the present disclosure will now be explained with reference to the accompanying drawings. Turning now to FIG. 1, there is shown one example of a powertrain of a four-wheel drive vehicle (as will be simply called the "vehicle" hereinafter) 1 to which the control system according to the embodiment of the present disclosure is applied. An operating mode of the vehicle 1 can be selected from a two-wheel drive mode in which one of pairs of front wheels 4 and rear wheels 3 is driven, and a four-wheel drive mode in which both pairs of the front wheels 4 and rear wheels 3 are driven. Each of the pairs of drive wheels may be driven by not only by a common prime mover but also by own prime movers. In a case of driving both pairs of the front wheels 4 and the rear wheels 3 by the common prime mover, a torque of the prime mover is delivered to any one of the pairs of wheels through a predetermined transmission route, and the torque is also distributed from the transmission route to the other pair of wheels through a transfer. Whereas, in a case of driving each pair of the front wheels 4 and the rear wheels 3 by own prime movers, torque of one of the prime movers is delivered to the front wheels 4 through a predetermined transmission route, and torque of another prime mover is delivered to the rear wheels 3 through another transmission route. According to the embodiment of the present disclosure, an internal combustion engine and a motor may be adopted as the prime mover.

Specifically, the vehicle 1 shown in FIG. 1 is a front-engine rear-drive layout (i.e., FR layout) based electric four-wheel drive vehicle (i.e., an e4WD vehicle) in which the front wheels 4 are driven by a second motor (referred to as "MG2" in FIG. 1) 5 and rear wheels 3 are driven by an engine 2. For example, an internal combustion engine such as a gasoline engine and a diesel engine may be employed as the engine 2, and the engine 2 may be started and stopped electrically according to need. In addition, an amount of fuel injection, an air intake, a flow rate of exhaust gas, an ignition timing etc. of the engine 2 may also be controlled electrically. The engine 2 is disposed in a front section of the vehicle 1 in such a manner that a rotational center axis of the engine 2 extends the longitudinal direction of the vehicle 1, and that a crank shaft (not shown) of the engine 2 is connected to an intermediate shaft 7 through a damper 6.

A first motor (referred to as "MG1" in FIG. 1) 8 is arranged coaxially with the intermediate shaft 7, and a rotor 9 of the first motor 8 is connected to the intermediate shaft 7. In other words, a shaft of the rotor 9 serves as the intermediate shaft 7, and the shaft of the rotor 9 is connected to the engine 2 through the damper 6. Specifically, the first motor 8 is a motor-generator that serves not only as a motor to generate a drive force for propelling the vehicle 1, but also as a generator to generate electricity when rotated by the engine or when the vehicle 1 is decelerated. In addition, the first motor 8 may also serves as a starter motor to crank the engine 2. For example, a permanent magnet synchronous motor having a generating function may be used as the first motor 8.

The intermediate shaft 7 is also connected to an automatic transmission (as will be simply called the "transmission" hereinafter) 11 via a starting clutch 10 that selectively connects and disconnects the engine 2 to/from the transmission 11. For example, a friction clutch in which a torque transmitting capacity is varied electrically may be adopted as the starting clutch 11. For example, in a case of launching the vehicle 1 by the engine 2, the starting clutch 10 is engaged while increasing the torque transmitting capacity gradually so as to launch the vehicle 1 smoothly without causing an engine stall and without launching the vehicle 1 abruptly. A conventional geared transmission or a continuously variable transmission that is controlled electrically to change a speed ratio may be adopted as the transmission 11.

The transmission 11 is provided with a switching mechanism 12 that switches a transmission mode between a low mode (referred to as "Lo" in Figures and a table) and a high mode (referred to as "Hi" in Figures and a table). The low mode is a speed reducing mode in which an input torque to the transmission 11 is multiplied at a predetermined factor to be delivered to the rear wheels 3. On the other hand, the high mode is a speed reducing mode in which the input torque to the transmission 11 is multiplied at a factor smaller than that in the low mode to be delivered to the rear wheels 3, or the input torque to the transmission 11 is delivered to the rear wheels 3 without being varied. For example, a conventional overdrive mechanism adopted to shift the mode between the low mode and the high mode in accordance with an engagement state of a clutch may be adopted as the switching mechanism 12. In the following description, the high mode will also be called the "non-deceleration mode".

An output shaft of the transmission 11 is connected to a rear differential gear unit 14 through a propeller shaft 13 so that the torque is distributed to the rear wheels 3 through each driveshaft 15. According to the embodiment of the present disclosure, a torque transmission route from the engine 2 to the rear wheels 3 serves as a first transmission route.

Figure 2:
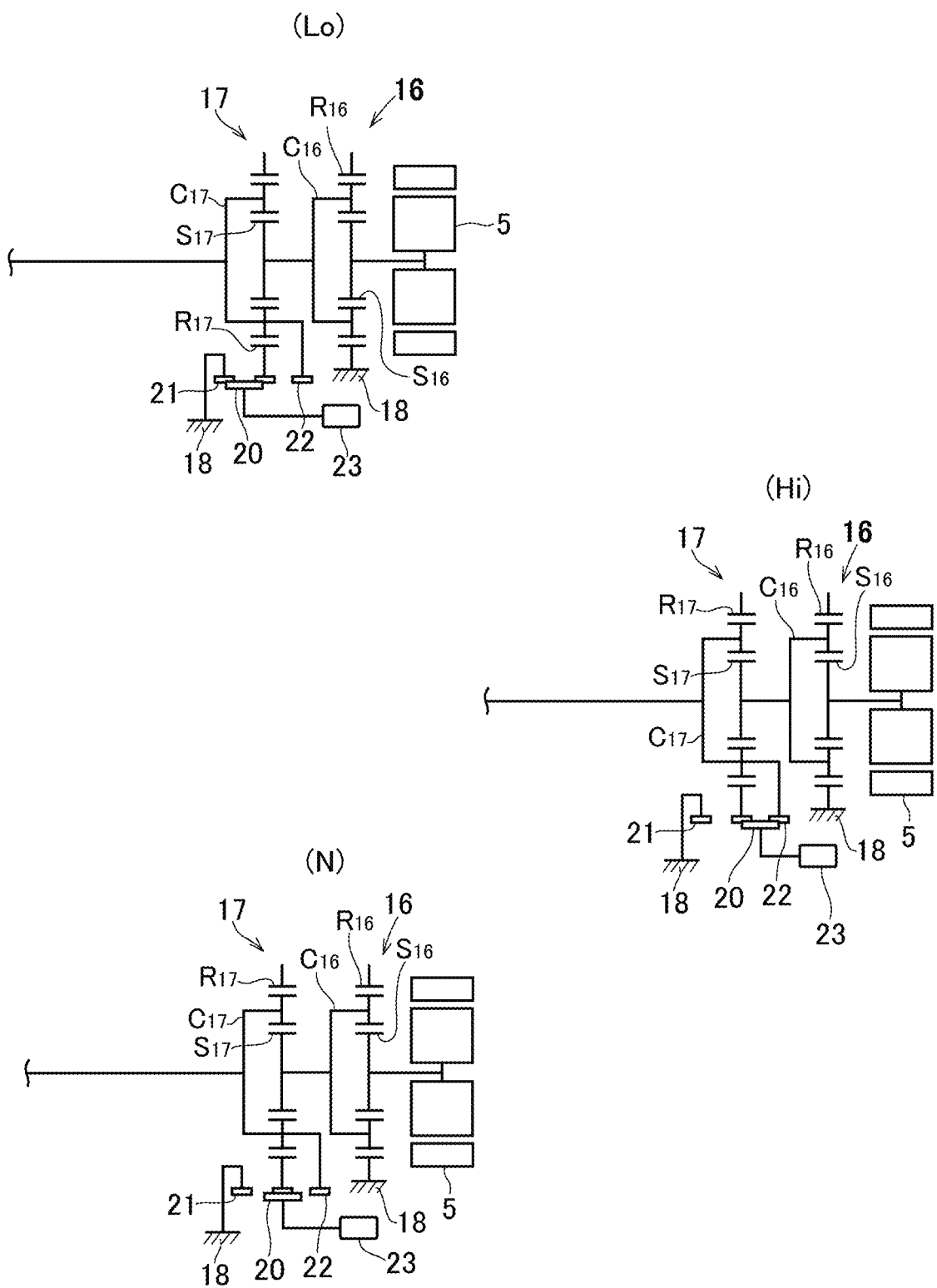
FIG. 2 is a skeleton diagram showing situations of a speed reducing mechanism and a switching mechanism in a low mode, a high mode, and a neutral mode.

The second motor 5 is disposed downstream of the transmission 11 on the right side or the left side in the vehicle 1 in the width direction. The second motor 5 is also a motor-generator, and an output shaft (i.e., a rotor shaft) extends toward the front section of the vehicle 1. A speed reducing mechanism 16 and a switching mechanism 17 are arranged coaxially with the second motor 5. Structures of the speed reducing mechanism 16 and the switching mechanism 17 are shown in FIG. 2 in more detail.

In order to allow the second motor 5 to rotate at a high speed, the speed reducing mechanism 16 is adapted to reduce an output speed lower than an input speed. In the example shown in FIG. 2, a single-pinion planetary gear unit is adopted as the speed reducing mechanism 16. The speed reducing mechanism 16 comprises a sun gear S16 as an input element, a ring gear R16 as a reaction element (or a fixed element) arranged concentrically with the sun gear S16, a plurality of pinion gears interposed between the sun gear S16 and the ring gear R16 while being meshed with those gears, and a carrier C16 as an output member supporting the pinion gears in a rotatable manner. In the speed reducing mechanism 16, specifically, the sun gear S16 is connected to the second motor 5, the ring gear R16 is fixed to a stationary member 18 such as a housing, and the carrier C16 is connected to the switching mechanism 17.

The switching mechanism 17 also switches a transmission mode between a low mode (referred to as "Lo" in figures and a table) and a high mode (referred to as "Hi" in figures and the table). In the low mode as a speed reducing mode, an input torque thereto is multiplied to be delivered to the front wheels 4. On the other hand, the high mode is a non-deceleration mode in which the input torque is multiplied at a factor (or a conversion rate) smaller than that in the low mode to be delivered to the front wheels 4, or the input torque is delivered to the front wheels 4 without being multiplied and reduced or while being reduced. For example, a gear mechanism or a wrapped transmission mechanism may be adopted as the switching mechanism 17. In the example shown in FIG. 2, a single-pinion planetary gear unit is adopted as the switching mechanism 17. The switching mechanism 17 comprises a sun gear S17 as an input element, a ring gear R17 as a reaction element (or a fixed element) arranged concentrically with the sun gear S17, a plurality of pinion gears interposed between the sun gear S17 and the ring gear R17 while being meshed with those gears, and a carrier C17 as an output member. In the switching mechanism 17, specifically, the sun gear S17 is connected to the carrier C16 of the speed reducing mechanism 16, the ring gear R17 is selectively connected to the stationary member 18 and to the carrier C17 through an engagement device 19, and the carrier C17 supports the pinion gears in a rotatable manner.

The engagement device 19 is a clutch mechanism adapted to selectively connect and disconnect a drive member to/from a driven member, and for example, a friction clutch and a dog clutch may be adopted as the engagement device 19. In the example shown in FIG. 2, a dog clutch is employed as the engagement device 19, and a shift sleeve 20 of the engagement device 19 is splined to the ring gear R17 as the drive member. A fixed spline 21 as the driven member and a connecting spline 22 are arranged coaxially with each other in a travelling direction of the shift sleeve 20 (i.e., in the axial direction) across the ring gear R17. In order to stop a rotation of the ring gear R17, the fixed spline 21 is connected to the stationary member 18.

Specifically, in order to stop a rotation of the ring gear R17, the ring gear R17 is connected to the stationary member 18 by engaging the shift sleeve 20 with both of the ring gear R17 and the fixed spline 21. In order to rotate the switching mechanism 17 integrally, the connecting spline 22 is connected to the carrier C17. Specifically, the switching mechanism 17 is rotated integrally by engaging the shift sleeve 20 with both of the ring gear R17 and the connecting spline 22 thereby connecting the ring gear R17 to the carrier C17. In this case, since two of the rotary elements of the switching mechanism 17 are connected to each other, a differential action among the rotary elements of the switching mechanism 17 is inhibited. That is, the switching mechanism 17 neither increase nor reduce the speed in this case.

The shift sleeve 20 may be positioned at a neutral position where the shift sleeve 20 is engaged with neither the fixed spline 21 nor the connecting spline 22. In a case that the shift sleeve 20 is situated at the neutral position, the ring gear R17 is allowed to rotate freely without establishing a reaction force. In this case, therefore, torque transmission between the sun gear S17 as the input element and the carrier C17 as the output element is interrupted. Thus, the shift sleeve 20 is shifted among the position to be engaged with the fixed spline 21, the neutral position, and the position to be engaged with the connecting spline 22. Specifically, the shift sleeve 20 is shifted among the above-mentioned three positions by an actuator 23. For example, the actuator 23 may be selected from an electromagnetic actuator, a hydraulic actuator, a combination of a motor and a rack-and-pinion etc. according to need.

The carrier C17 as the output member of the switching mechanism 17 is connected to a front differential gear unit 24 so as to distribute torque to the front wheels 4 through each driveshaft 25. Accordingly, the second motor 5 serves as a motor of the embodiment of the present disclosure, and a torque transmission route from the second motor 5 to the front wheels 4 serves as a second transmission route of the embodiment of the present disclosure.

Thus, the prime mover of the vehicle 1 includes the first motor 8, the second motor 5, and the engine 2, and the first motor 8 and the second motor 5 are connected respectively with an electric power source 26 including an inverter and a converter. The vehicle 1 is provided with an electronic control unit (to be abbreviated as the "ECU" hereinafter) 27 as a controller. For example, the first motor 8 and the second motor 5 are controlled by the ECU 27 through the electric power source 26, and the engine 2 is also controlled by the ECU 27 to be started and stopped, and to generate power. In addition, the ECU 27 controls a speed ratio of the transmission 11, an engagement state and a torque transmitting capacity of the starting clutch 10, modes of the switching mechanisms 12 and 17 and so on. The control object such as the engine 2, the electric power source 26 and so on may be provided individually with the ECU. In this case, those ECUs may be controlled by the ECU 27. Instead, those ECUs may be integrated to form the ECU 27.

The ECU 27 has a microcomputer as its main constituent that is configured to perform a calculation based on incident data detected by sensors (not shown) arranged in the vehicle 1 and data stored in advance, and to transmit a calculation result in the form of command signal. Specifically, the data sent to the ECU 27 includes a signal from a ready switch (or an ignition switch) 28 that commands the prime mover to start or stop, and a signal from a mode selection switch 29.

The mode selection switch 29 is operated manually by a driver to select the operating mode of the vehicle 1. For example, a dial switch that is turned to select the operating mode, a push-button switch that is pushed to shift the operating mode, and switches arranged individually to establish each operating mode may be adopted as the mode selection switch 29. As explained later, the control system according to the embodiment of the present disclosure is configured to establish an operating mode different from the mode selected by the mode selection switch 29. Therefore, in order to resolve an inconsistency between the operating mode selected by the control system and the operating mode selected by the mode selection switch 29 and indicated by e.g., an indicator, the mode selection switch 29 has a function to cancel or change the selecting operating mode if the operating mode is changed by the control system.

The operating mode of the vehicle 1 may be selected from the modes shown in table 1.

TABLE 1

| | 2WD<br>Normal mode | 4WD-Hi<br>(Control 4WD) | 4WD-Lo |
|---|---|---|---|
| Rear Switching mechanism | Hi | Hi | Lo |
| Front switching mechanism | Hi | Hi | Lo |
| HV/EV | HV:EV | HV | HV |
| Drive force | Small | Middle | Large |
| Fuel consumption | Small | Middle | Large |

The operating mode of the vehicle 1 may be selected from a two-wheel drive mode (referred to as "2WD" in the figures and the table), a four-wheel drive high mode (referred to as "4WD-Hi" in the figures and the table), and a four-wheel drive low mode (referred to as "4WD-Lo" in the figures and the table). The two-wheel drive mode is selected by turning the mode selection switch 29 to a 2WD position, or turning off the mode selection switch 29. That is, the two-wheel drive mode is selected by default, and hence the two-wheel drive mode may also be called the normal mode.

In the two-wheel drive mode, the vehicle 1 is propelled by driving any one of the pairs of the rear wheels 3 and the front wheels 4. In the vehicle 1, therefore, the two-wheel drive mode may be further selected from a hybrid mode (referred to as "HV" in the table) in which the rear wheels 3 are driven by the engine 2 and the first motor 8, and an electric vehicle mode (referred to as "EV" in the table) in which the front wheels 4 are driven by the second motor 5. In the two-wheel drive mode, the hybrid mode and the electric vehicle mode is selected automatically depending on a running condition such as a required drive force governed by a position of an accelerator pedal (not shown), and a state of charge level of the electric power source 26. In both of the hybrid mode and the electric vehicle mode, both of the switching mechanism 12 in the first transmission route and the switching mechanism 17 in the second transmission route are brought into the high mode as the non-deceleration mode. In order to allow the second motor 5 to regenerate electricity during deceleration of the vehicle 1, the switching mechanism 17 in the second transmission route is brought into the high mode to connect the second motor 5 to the front wheels 4. In other words, the engagement device 19 will not be brought into the neutral mode even in the hybrid mode.

The four-wheel drive high mode is selected by turning the mode selection switch 29 to a 4WD-Hi position. Specifically, the four-wheel drive high mode is an all-wheel drive mode in which the rear wheels 3 are driven by the engine 2 and the first motor 8, and the front wheels 4 are driven by the second motor 5. A ratio between the drive force established by the rear wheels 3 and the drive force established by the front wheels 4 to achieve the required drive force may be adjusted in accordance with a running condition of the vehicle 1. For example, when a large drive force is required, the drive force established by the rear wheels 3 and the drive force established by the front wheels 4 will be substantially equalized. In the four-wheel drive high mode, both of the switching mechanism 12 in the first transmission route and the switching mechanism 17 in the second transmission route are also brought into the high mode.

The four-wheel drive low mode is selected by turning the mode selection switch 29 to a 4WD-Lo position. The four-wheel drive low mode is also the all-wheel drive mode in which the rear wheels 3 are driven the engine 2 and the first motor 8, and the front wheels 4 are driven by the second motor 5. In the four-wheel drive low mode, both of the switching mechanism 12 in the first transmission route and the switching mechanism 17 in the second transmission route are brought into the low mode as a speed reducing mode. In addition, a ratio between the drive force established by the rear wheels 3 and the drive force established by the front wheels 4 to achieve the required drive force is fixed to a predetermined ratio. For example, the drive force established by the rear wheels 3 and the drive force established by the front wheels 4 are substantially equalized.

In the four-wheel drive low mode, a largest drive force can be generated to propel the vehicle 1. A drive force possible to be generated in the four-wheel drive high mode is smaller than the drive force generated in the four-wheel drive low mode, but larger than a drive force possible to be generated in the two-wheel drive mode (2WD<4WD-Hi<4WD-Lo). By contrast, a fuel consumption is smallest in the two-wheel drive mode. A fuel consumption in the four-wheel drive high mode is larger than the fuel consumption in the two-wheel drive mode, but smaller than a fuel consumption in the four-wheel drive low mode (4WD-Lo>4WD-Hi>2WD).

As described, the operating mode of the vehicle 1 can be selected manually by operating the mode selection switch 29. However, during propulsion in the selected mode, the driver may not be particularly aware of the operating mode currently selected. In addition, the driver may not confirm the selected operating mode when launching the vehicle by turning on the ready switch 28. Likewise, if the vehicle is launched by another driver, another driver may also not confirm the selected operating mode when launching the vehicle. If the four-wheel drive mode is selected unintentionally when launching the vehicle under the circumstances in which a large drive force is not especially required to launch the vehicle, a fuel consumption will be increased. In order to reduce a fuel consumption of the vehicle 1, the control system according to the embodiment of the present disclosure is configure to execute the routines to be explained in the following.

Figure 3:
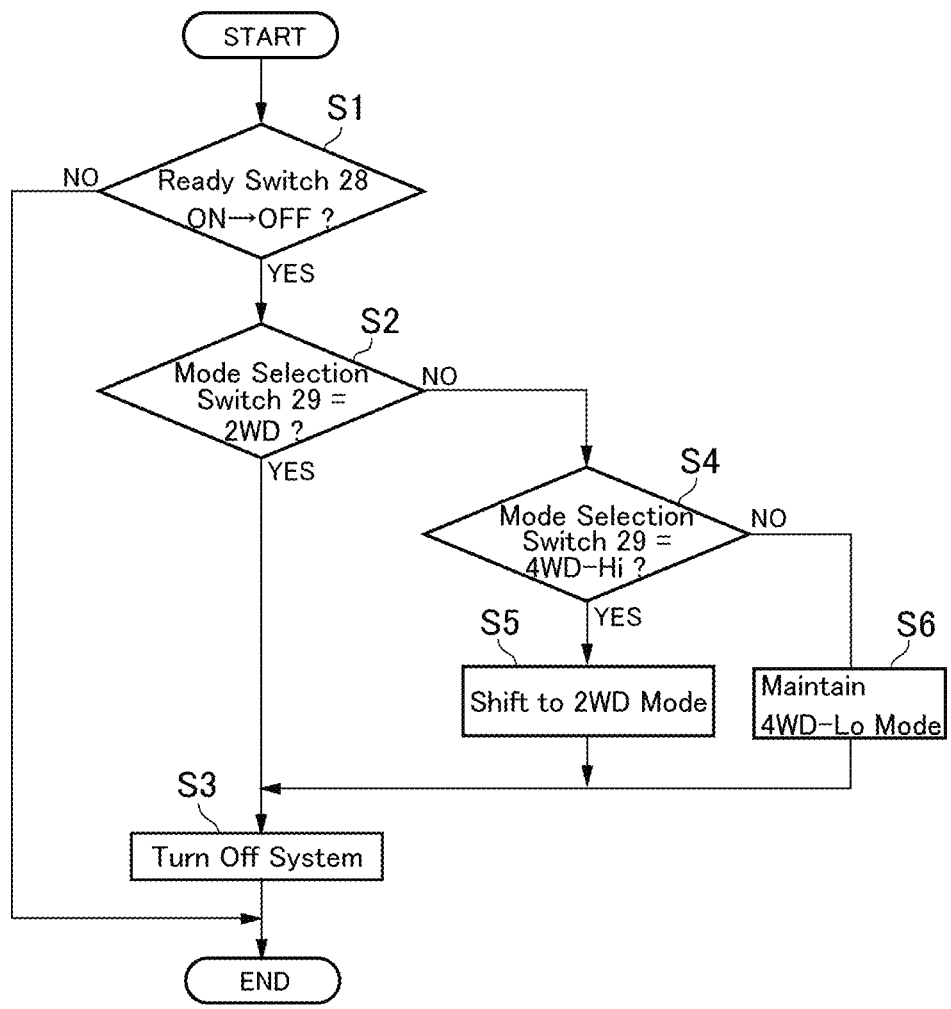
FIG. 3 is a flowchart showing one example of a routine executed by the control system.

Turning to FIG. 3, there is shown one example of the routine executed by the ECU 27. The routine shown in FIG. 3 is executed in the situation where the prime mover is under control. For example, the routine shown in FIG. 3 is executed during propulsion of the vehicle 1, or when a speed of the vehicle 1 is reduced to zero (that is, when the vehicle 1 is stopped). In order to determine whether the control of the prime mover will be temporarily terminated, at step S1, it is determined whether the ready switch 28 being turned on is turned off. In other words, at step S1, it is determined whether a condition to restart the control of the prime mover is satisfied.

If the answer of step S1 is NO, the control of the prime mover is continued and the routine is returned without carrying out any specific control. By contrast, if the ready switch 28 is turned off so that the answer of step S1 is YES, the routine progresses to step S2 to determine whether the two-wheel drive mode is selected by the mode selection switch 29. That is, at step S2, it is determined whether the two-wheel drive mode is selected immediately before terminating the control of the prime mover. Such determination at step S2 may be made based on the signal transmitted from the mode selection switch 29. Instead, such determination at step S2 may also be made based on data transmitted recently from the mode selection switch 29 and stored e.g., in the ECU 27.

If the two-wheel drive mode is selected by the mode selection switch 29 so that the answer of step S2 is YES, the routine progresses to step S3 to shut down the entire system while terminating the control of the prime mover. By contrast, if the answer of step S2 is NO, the routine progresses to step S4 to determine whether the four-wheel drive high mode is selected by the mode selection switch 29. Such determination at step S4 may also be made based on the signal transmitted from the mode selection switch 29. Instead, such determination at step S4 may also be made based on data transmitted recently from the mode selection switch 29 and stored e.g., in the ECU 27. If the four-wheel drive high mode is currently selected so that the answer of step S4 is YES, the routine progresses to step S5 to shift the operating mode from the four-wheel drive high mode to the two-wheel drive mode. Thus, in this case, the operating mode is shifted to the two-wheel drive mode that is different from the mode selected by the mode selection switch 29. Thereafter, the routine progresses to step S3 to shut down the system.

Thus, the termination of the control of the prime mover is determined at step S2. If the control of the prime mover is terminated, the operating mode selected by the mode selection switch 29 before restarting the control of the prime mover is detected at step S3. In the case that the two-wheel drive mode was selected by the mode selection switch 29 before restarting the control of the prime mover, the two-wheel drive mode is maintained when restarting the control of the prime mover. By contrast, if the four-wheel drive mode was selected by the mode selection switch 29 before restarting the control of the prime mover, the operating mode is shifted to the two-wheel drive mode at step S5 when restarting the control of the prime mover.

As described, the operating mode of the vehicle 1 may be selected manually by the mode selection switch 29 from the two-wheel drive mode, the four-wheel drive high mode, and the four-wheel drive low mode. If the four-wheel drive low mode is selected by the mode selection switch 29 so that the answer of step S4 is NO, the routine progresses to step S6 to maintain the four-wheel drive low mode. Thereafter, the routine progresses to step S3 to shut down the system. Specifically, the four-wheel drive low mode is maintained by controlling the actuator 23 in such a manner as to maintain the engagement of the shift sleeve 20 of the engagement device 19 with the fixed spline 21, while driving the second motor 5 in such a manner as to achieve the required drive force. Therefore, when a control to disengage the engagement device 19 is executed, the engagement device 19 may be disengaged certainly as intended. In addition, the engagement device 19 will not be disengaged unintentionally even if the torque applied to the engagement device 19 drops.

Thus, according to the embodiment of the present disclosure, the two-wheel drive mode is selected when starting the control of the prime mover again, except in the case of selecting the four-wheel drive low mode before turning off the ready switch 28. Therefore, even if the driver did not shift the operating mode to the two-wheel drive mode before turning off the ready switch 28, the vehicle 1 may be launched in the two-wheel drive mode to improve fuel efficiency.

Figure 4:
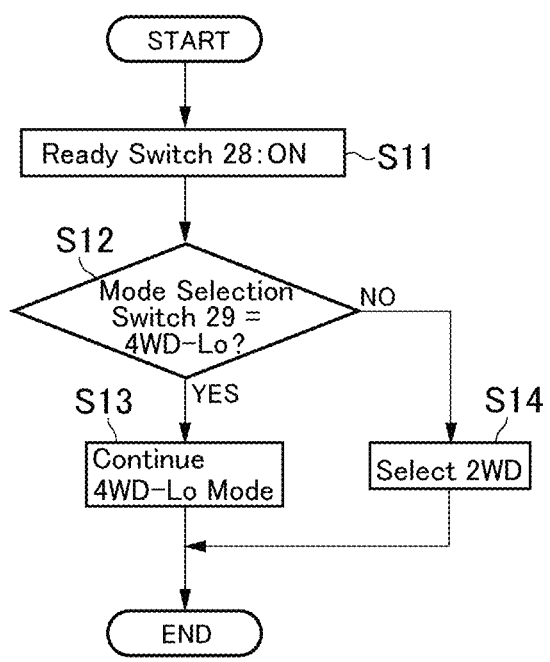
FIG. 4 is a flowchart showing another example of a routine executed by the control system.

The routine shown in FIG. 3 is configured to select the desired operating mode during a period from a point at which the ready switch 28 is turned off to a point at which the system is shut down. According to the embodiment of the present disclosure, the operating mode may be shifted to the desired mode selected by the mode selection switch 29 until the control of the prime mover is restarted. Turning to FIG. 4, there is shown a routine configured to shift the operating mode to the desired mode when the ready switch 28 being turned off is turned on again.

When the ready switch 28 is turned on at step S11, the routine progresses to step S12 to determine whether the four-wheel drive low mode was selected by the mode selection switch 29 when the ready switch 28 was turned off. Given that the dog clutch is adopted as the engagement device 19, the engagement device 19 may not be disengaged even if a disengagement command is transmitted, depending on a magnitude of the torque applied to the engagement device 19. For this reason, in the case that the four-wheel drive low mode was selected when terminating the control of the prime mover, the four-wheel drive low mode is to be maintained. If the answer of step S12 is YES, therefore, the routine progresses to step S13 to transmit a command signal to establish the four-wheel drive low mode thereby maintaining the four-wheel drive low mode previously established. Thereafter, the routine returns.

By contrast, if the answer of step S12 is NO, the routine progresses to step S14 to select the two-wheel drive mode. As described, the operating mode of the vehicle 1 may be selected manually by the mode selection switch 29 from the two-wheel drive mode, the four-wheel drive high mode, and the four-wheel drive low mode. That is, in the case that the answer of step S12 is NO, the two-wheel drive mode or the four-wheel drive high mode is selected by the mode selection switch 29. If the two-wheel drive mode or the four-wheel drive high mode is thus selected by the mode selection switch 29 when turning off the ready switch 28, the two-wheel drive mode is maintained, or the operating mode is shifted from the four-wheel drive high mode to the two-wheel drive mode. Thereafter, the routine returns. By executing the routine shown in FIG. 4, therefore, the four-wheel drive high mode will not be selected unintentionally when launching the vehicle 1 again so that the fuel efficiency is improved.

Although the above exemplary embodiments of the present disclosure have been described, it will be understood by those skilled in the art that the present disclosure should not be limited to the described exemplary embodiments, and various changes and modifications can be made within the scope of the present disclosure. In the foregoing embodiment, the dog clutch is employed as the engagement device 19. Therefore, as described, the engagement device may not be disengaged depending on a magnitude of the torque applied to the engagement device 19. In order to avoid such disadvantage, in the foregoing embodiment, the four-wheel drive low mode is maintained if the four-wheel drive low mode was selected when the ready switch 28 was turned off. However, in a case that a frictional engagement device is employed as the engagement device 19, the engagement device 19 may be engaged and disengaged irrespective of a magnitude of the torque applied thereto. In this case, therefore, the two-wheel drive mode may be selected when restarting the control of the prime mover, even if the four-wheel drive low mode was selected when the ready switch 28 was turned off.

In addition, the control system according to the embodiment of the present disclosure may also be applied to a four-wheel drive vehicle in which only one four-wheel drive mode is available, or in which the four-wheel drive mode is selected from three or more modes. Further, the control system according to the embodiment of the present disclosure may also be applied to a four-wheel drive vehicle in which the two-wheel drive mode may be selected from a plurality of modes.

What is claimed is:

1. A control system for a four-wheel drive vehicle in which an operating mode is selected from a two-wheel drive mode in which a torque generated by a prime mover is delivered to any one of pairs of front wheels and rear wheels to propel the vehicle, and a four-wheel drive mode in which the torque generated by the prime mover is delivered to both pairs of the front wheels and the rear wheels, comprising:

a mode selection switch that is operated manually to select the operating mode from the two-wheel drive mode and the four-wheel drive mode; and a controller that shifts the operating mode between the two-wheel drive mode and the four-wheel drive mode, wherein the controller is configured to detect the operating mode selected by the mode selection switch before restarting a control of a prime mover, if the control of the prime mover is terminated, and select the two-wheel drive mode when restarting the control of the prime mover, if the two-wheel drive mode or the four-wheel drive mode was selected by the mode selection switch before restarting the control of the prime mover.

2. The control system for the four-wheel drive vehicle as claimed in claim 1, wherein the four-wheel drive mode includes a high mode in which the torque generated by the prime mover is delivered to both pairs of the front wheels and the rear wheels while being multiplied, or without being multiplied and reduced or while being reduced, and a low mode in which the torque generated by the prime mover is delivered to both pairs of the front wheels and the rear wheels while being multiplied, the mode selection switch is adapted to further select the high mode and the low mode, and the controller is further configured to select the two-wheel drive mode when restarting the control of the prime mover, if the two-wheel drive mode or the high mode of the four-wheel drive mode was selected by the mode selection switch before restarting the control of the prime mover, and select the low mode of the four-wheel drive mode when restarting the control of the prime mover, if the low mode was selected by the mode selection switch before restarting the control of the prime mover.

3. The control system for the four-wheel drive vehicle as claimed in claim 1, wherein the prime mover includes an engine that generates a drive force delivered to the pair of rear wheels, and a motor that generates a drive force delivered to the pair of front wheels, the four-wheel drive vehicle comprises a first transmission route to transmit an output torque of the engine to the pair of rear wheels, and a second transmission route to transmit an output torque of the motor to the pair of front wheels, the first transmission route includes a first switching mechanism that switches a mode thereof between a speed reducing mode in which an input torque thereto is multiplied at a predetermined factor to be delivered to the pair of rear wheels, and a non-deceleration mode in which the input torque thereto is varied at a factor smaller than the factor in the speed reducing mode to be delivered to the pair of rear wheels, and the second transmission route includes a second switching mechanism that switches a mode thereof between a speed reducing mode in which an input torque thereto is multiplied at a predetermined factor to be delivered to the pair of front wheels, and a non-deceleration mode in which the input torque thereto is varied at a factor smaller than the factor in the speed reducing mode to be delivered to the pair of front wheels.

4. The control system for the four-wheel drive vehicle as claimed in claim 2, wherein the prime mover includes an engine that generates a drive force delivered to the pair of rear wheels, and a motor that generates a drive force delivered to the pair of front wheels, the four-wheel drive vehicle comprises a first transmission route to transmit an output torque of the engine to the pair of rear wheels, and a second transmission route to transmit an output torque of the motor to the pair of front wheels, the first transmission route includes a first switching mechanism that switches a mode thereof between a speed reducing mode in which an input torque thereto is multiplied at a predetermined factor to be delivered to the pair of rear wheels, and a non-deceleration mode in which the input torque thereto is varied at a factor smaller than the factor in the speed reducing mode to be delivered to the pair of rear wheels, and the second transmission route includes a second switching mechanism that switches a mode thereof between a speed reducing mode in which an input torque thereto is multiplied at a predetermined factor to be delivered to the pair of front wheels, and a non-deceleration mode in which the input torque thereto is varied at a factor smaller than the factor in the speed reducing mode to be delivered to the pair of front wheels.

5. The control system for the four-wheel drive vehicle as claimed in claim 3, wherein the second switching mechanism comprises an engagement device having a drive member and a driven member selectively engaged with each other, the speed reducing mode is established by engaging the drive member with the driven member, and the non-deceleration mode is established by disengaging the drive member from the driven member.

6. The control system for the four-wheel drive vehicle as claimed in claim 4, wherein the second switching mechanism comprises an engagement device having a drive member and a driven member selectively engaged with each other, the speed reducing mode is established by engaging the drive member with the driven member, and the non-deceleration mode is established by disengaging the drive member from the driven member.

* * * * *